US009297892B2

(12) United States Patent
Smith et al.

(10) Patent No.: US 9,297,892 B2
(45) Date of Patent: Mar. 29, 2016

(54) METHOD OF OPERATING A RADAR SYSTEM TO REDUCE NUISANCE ALERTS CAUSED BY FALSE STATIONARY TARGETS

(71) Applicant: DELPHI TECHNOLOGIES, INC., Troy, MI (US)

(72) Inventors: Matthew R. Smith, Springboro, OH (US); Robert J. Cashler, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 456 days.

(21) Appl. No.: 13/855,431

(22) Filed: Apr. 2, 2013

(65) Prior Publication Data

US 2014/0292554 A1   Oct. 2, 2014

(51) Int. Cl.
| | |
|---|---|
| G01S 13/93 | (2006.01) |
| G01S 13/04 | (2006.01) |
| B60K 31/00 | (2006.01) |
| G01S 7/41 | (2006.01) |

(52) U.S. Cl.
CPC ............. *G01S 13/04* (2013.01); *B60K 31/0008* (2013.01); *G01S 7/411* (2013.01); *G01S 13/931* (2013.01); *B60K 2031/0016* (2013.01); *B60W 2510/20* (2013.01); *B60W 2520/10* (2013.01); *B60W 2520/14* (2013.01); *B60W 2550/10* (2013.01)

(58) Field of Classification Search
CPC ....... G01S 13/04; G01S 13/931; G01S 7/411; B60K 31/0008; B60K 2031/0016; B60W 2520/10; B60W 2520/14; B60W 2550/10; B60W 2510/20

USPC ............... 342/27, 70–72; 340/903, 435–436; 701/301

See application file for complete search history.

(56) References Cited

U.S. PATENT DOCUMENTS

| | | | | |
|---|---|---|---|---|
| 5,631,639 | A * | 5/1997 | Hibino ............... | B60K 31/0008 180/167 |
| 5,714,927 | A * | 2/1998 | Henderson ............ | G01S 13/931 340/435 |
| 6,121,916 | A * | 9/2000 | McDade ............... | G01S 13/931 342/114 |
| 6,680,689 | B1 * | 1/2004 | Zoratti ................... | B60Q 9/008 180/169 |
| 9,176,223 | B2 * | 11/2015 | Derham .................... | G01S 7/36 |
| 9,208,673 | B2 * | 12/2015 | Grignan ................ | G08B 21/08 |

(Continued)

FOREIGN PATENT DOCUMENTS

| | | | |
|---|---|---|---|
| EP | 2 023 158 A2 | 2/2009 | |
| GB | 979621 A * | 1/1965 | ............. B61L 17/02 |

OTHER PUBLICATIONS

Heong-tae Kim; Bongsob Song, "Vehicle recognition based on radar and vision sensor fusion for automatic emergency braking," in Control, Automation and Systems (ICCAS), 2013 13th International Conference on , vol., no., pp. 1342-1346, Oct. 20-23, 2013.*

(Continued)

*Primary Examiner* — John B Sotomayor
(74) *Attorney, Agent, or Firm* — Lawrence D. Hazelton

(57) ABSTRACT

A method for operating a radar system on a vehicle to reduce nuisance alerts caused by a stationary structure proximate to the vehicle. The method includes determining a stationary count indicative of the number of targets detected by the radar system that are within a travel path of the vehicle and are classified by the radar system as stationary, and indicating that the vehicle is proximate to a stationary structure if the stationary count is greater than a count threshold.

10 Claims, 2 Drawing Sheets

(56) References Cited

U.S. PATENT DOCUMENTS

| | | | |
|---|---|---|---|
| 2004/0189451 A1* | 9/2004 | Zoratti | B60Q 9/008 340/435 |
| 2005/0228580 A1 | 10/2005 | Winner et al. | |
| 2006/0232440 A1* | 10/2006 | Pieralli | G01S 13/04 340/905 |
| 2007/0143004 A1 | 6/2007 | Sakuma | |
| 2008/0272898 A1* | 11/2008 | Irion | B60Q 9/008 340/436 |
| 2010/0049413 A1 | 2/2010 | Makino et al. | |
| 2010/0052884 A1* | 3/2010 | Zeppelin | B60W 30/16 340/435 |
| 2010/0253493 A1* | 10/2010 | Szczerba | G01S 13/723 340/435 |
| 2010/0253539 A1* | 10/2010 | Seder | G01S 13/723 340/903 |
| 2011/0282581 A1* | 11/2011 | Zeng | G01S 17/936 701/301 |
| 2012/0025964 A1* | 2/2012 | Beggs | B60Q 1/2673 340/435 |
| 2013/0063257 A1* | 3/2013 | Schwindt | B60W 30/095 340/425.5 |
| 2013/0093613 A1* | 4/2013 | Itoh | G01S 13/345 342/70 |
| 2013/0176161 A1* | 7/2013 | Derham | G01S 7/36 342/27 |
| 2014/0292554 A1* | 10/2014 | Smith | B60K 31/0008 342/27 |
| 2014/0313339 A1* | 10/2014 | Diessner | H04N 7/18 348/148 |
| 2015/0338505 A1* | 11/2015 | Oshima | G01S 7/28 342/107 |

OTHER PUBLICATIONS

Yong Cheol Kim; Byung Cheol Choi, "Vehicular pulse-radar with very low false alarm rate by on-off pulse control and adaptive threshold," in Vehicular Technology Conference Proceedings, 2000. VTC 2000-Spring Tokyo. 2000 IEEE 51st , vol. 2, no., pp. 1596-1600 vol. 2, 2000.*

European Search Report dated Jul. 31, 2014.

* cited by examiner

METHOD OF OPERATING A RADAR SYSTEM TO REDUCE NUISANCE ALERTS CAUSED BY FALSE STATIONARY TARGETS

TECHNICAL FIELD OF INVENTION

This disclosure generally relates to a method for operating a radar system on a vehicle to reduce nuisance alerts caused by detecting false targets, and more particularly relates to indicating that the vehicle is proximate to a stationary structure if a stationary count of detected stationary targets is greater than a count threshold.

BACKGROUND OF INVENTION

Some vehicles are equipped with radar systems such as an Electronically-Scanning Radar (ESR) as part of a Forward Collision Warning (FCW) or Collision-Imminent Braking (CIB) system. However, many of these radar systems are not configured to determine an elevation angle (relative to the radar sensor) of a detected target. As such, targets that are above the vehicle (i.e. out-of-path vertically), for example the ceiling of a tunnel or a bridge crossing over the vehicle roadway, appear to the radar system to be similar to targets that are actually in the path of the vehicle. It has been observed that some tunnels cause these radar systems to incorrectly detect and classify targets as in-path stationary targets. These false targets can cause undesirable reactions by vehicle safety systems (e.g. FCW, CIB) that may lead to customer dissatisfaction.

SUMMARY OF THE INVENTION

In accordance with one embodiment, a method for operating a radar system on a vehicle to reduce nuisance alerts caused by a stationary structure proximate to the vehicle is provided. The method includes the step of determining a stationary count indicative of the number of targets detected by the radar system that are within a travel path of the vehicle and are classified by the radar system as stationary. The method also includes the step of indicating that the vehicle is proximate to a stationary structure if the stationary count is greater than a count threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
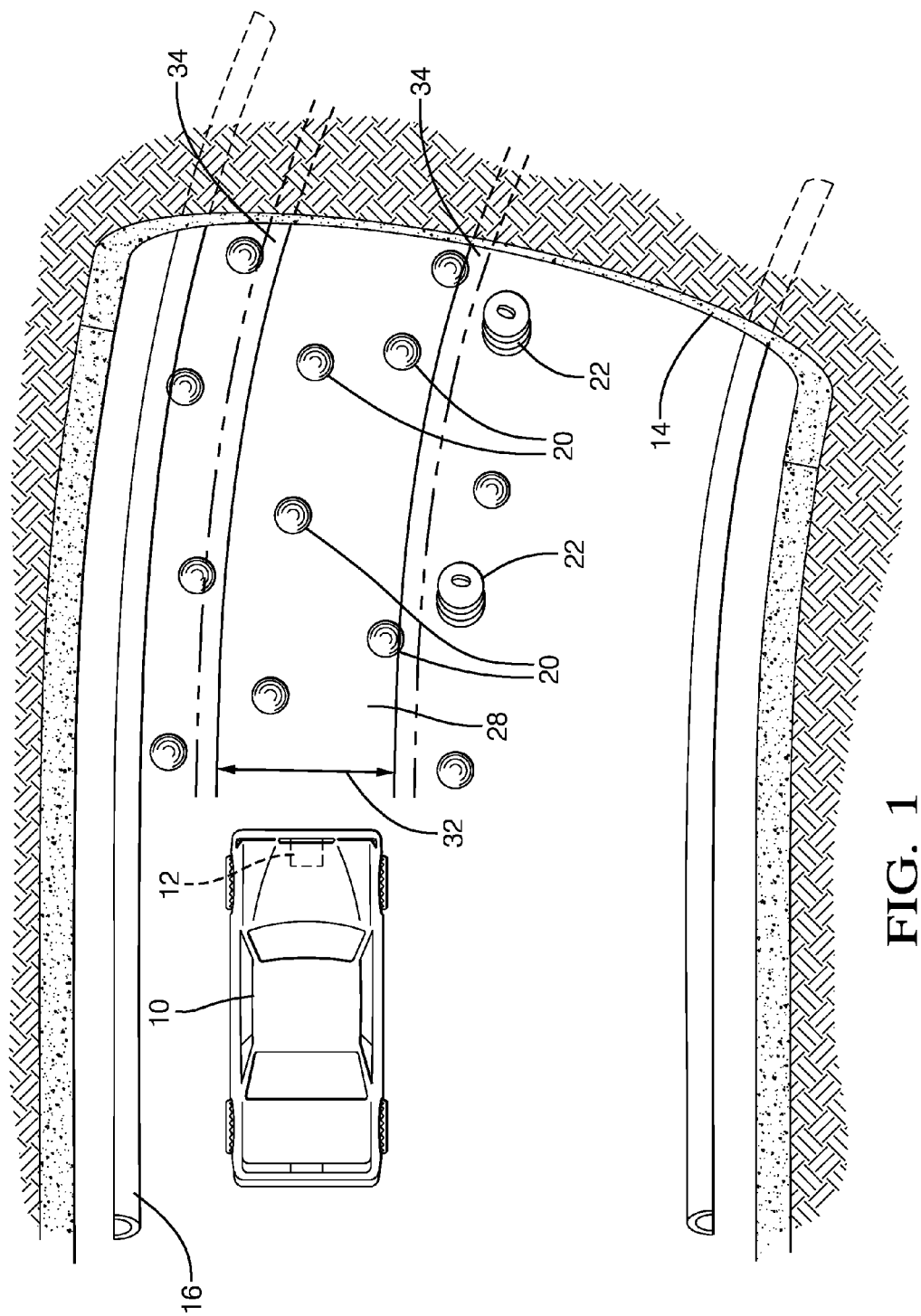
FIG. 1 is perspective view of a vehicle equipped with a radar system in accordance with one embodiment.

FIG. 1 illustrates a non-limiting example of a vehicle 10 equipped with a radar system 12 and traveling in a tunnel 14. The radar system 12 is illustrated as being mounted on the front of the vehicle 10, but it should be recognized that other locations are suitable such as on top of the vehicle 10, behind the windshield of the vehicle 10, or as part of a headlight or turn signal assembly. In this non-limiting example, the radar system 12 is generally configured to detect an object or target located forward of the vehicle 10. Alternatively, the radar system 12 may be configured to detect object or target behind the vehicle 10 such as another vehicle approaching the vehicle 10 from the rear, or objects getting closer to the vehicle 10 because the vehicle 10 is backing up or traveling in reverse.

Figure 2:
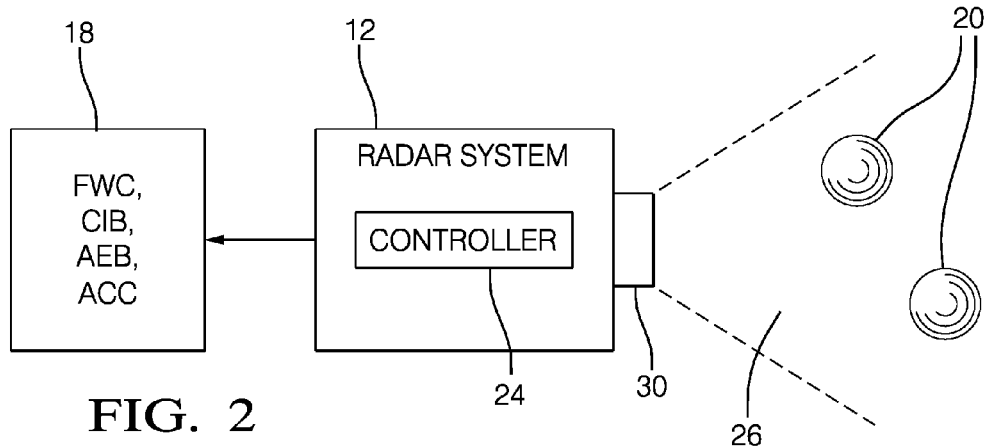
FIG. 2 is a block diagram of the radar system of FIG. 1 in accordance with one embodiment.

FIG. 2 further illustrates a non-limiting example of the radar system 12. Typically, the radar system 12 is in communication with, or part of, a one or more vehicle safety systems 18 such as a Forward Collision Warning (FCW) system, a Collision-Imminent Braking (CIB) system, an Automatic Emergency Braking (AEB) system, or an Adaptive Cruise Control (ACC) system. The radar system 12 is shown as being separate from the one or more vehicle safety systems 18 only for illustration purposes, and those in the art will recognize that all of the various systems may be integrated into a single housing. The radar system 12 may include a controller 24. The controller 24 may include a processor (not shown) such as a microprocessor or other control circuitry as should be evident to those in the art. The controller 24 may include memory, including non-volatile memory, such as electrically erasable programmable read-only memory (EEPROM) for storing one or more routines, thresholds and captured data. The one or more routines may be executed by the processor to perform steps for determining or analyzing signals received by the controller 24 for operating the radar system 12 as described herein Some radar systems can only determine a range or distance, and a bearing or azimuth (i.e. a horizontal displacement or direction) to a target, and are not configured to determine an elevation of the target (i.e. a vertical displacement or direction). Such a radar system may not reliably distinguish an overhead bridge from an object upon the roadway that the vehicle 10 is traveling and within a travel path 28 of the vehicle 10. It has been observed that, in some instances while the vehicle 10 is traveling proximate to or adjacent to various stationary targets such as the walls of the tunnel 14, or approaching an overhead bridge (not shown) that the vehicle 10 is about to pass under, the radar system 12 may detect a plurality of targets 20 such that the roadway appears to the radar system 12 to be cluttered with the targets 20. Too many targets (i.e. a cluttered roadway) may cause one or more of the vehicle safety systems 18 to respond or react in an undesirable manner. For example, the ACC may unnecessarily brake in order to reduce vehicle speed while in the tunnel 14, or the FCW may issue a warning when no actual threat is present.

Another problem that has been observed is that objects along the roadway such as a guardrail 16 and/or construction-zone obstacles 22 (e.g. orange barrels) may also cause roadway ahead of the vehicle 10 to appear to the radar system 12 to be cluttered with targets, particularly if the upcoming roadway begins to curve. It should be appreciated that a field of view 26 of the radar system 12 is generally fixed relative to the vehicle 10. As such, targets that appear to the radar system 12 to be directly in front of the vehicle 10 may actually be alongside the roadway because the roadway forward of the vehicle may curve. However, it has been observed that when, for example, a curved roadway is lined with a plurality of the construction zone obstacles 22, the radar system 12 may sense that the roadway is cluttered with an excessive number of stationary targets in the travel path 28, and so the one or more vehicle safety systems 18 may react in an undesirable manner.

Figure 3:
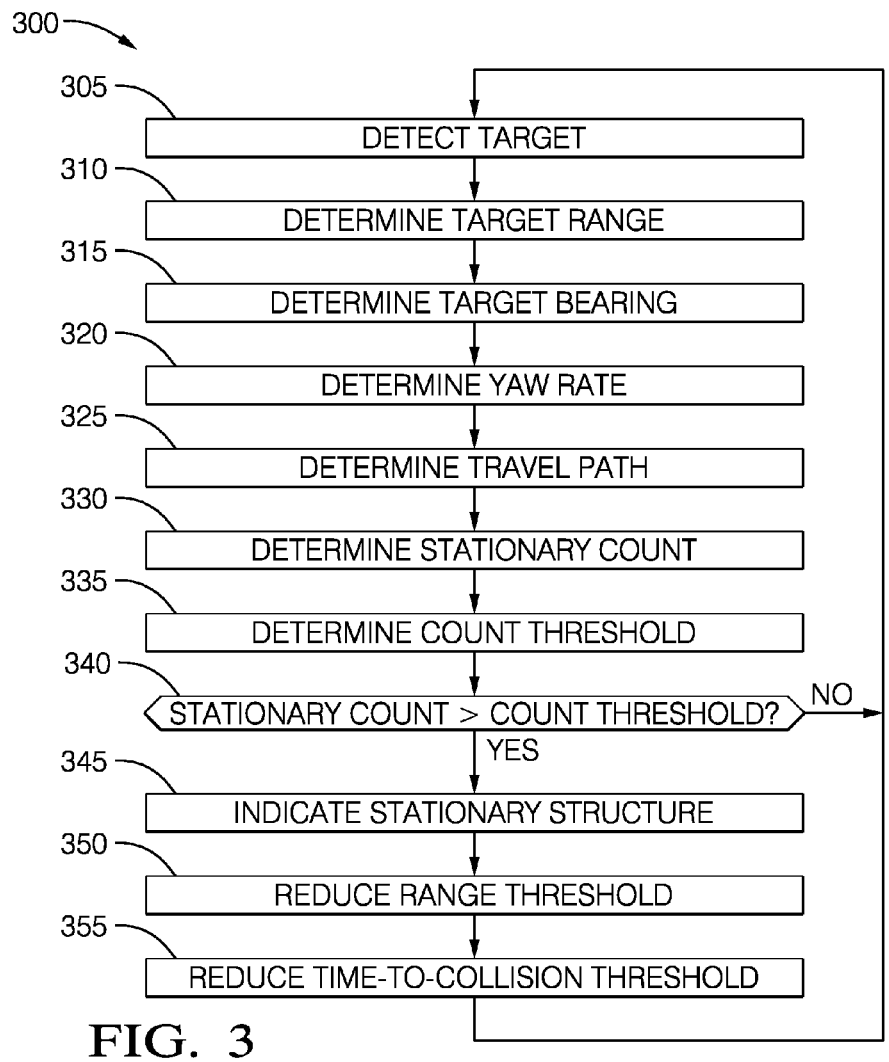
FIG. 3 is a flowchart of a method for operating the radar system of FIG. 1 in accordance with one embodiment.

FIG. 3 illustrates a non-limiting example of a method 300 for operating the radar system 12 on a vehicle 10 to reduce nuisance alerts caused by a stationary structure proximate to the vehicle 10. As used herein, a stationary structure is characterized as an object or target that is not moving relative to the surrounding environment, i.e. has a fixed location. Examples of a stationary structures include, but are not limited to, one or more of a tunnel 14, a guardrail 16, an overhead bridge (not shown), and/or one or more construction-zone obstacles 22 such as orange barrels or safety barriers. As used herein, a nuisance alert is an unwarranted reaction by the one or more vehicle safety systems 18 to the presence of stationary objects. Examples of a nuisance alert include, but are not limited to, slowing of the vehicle 10 by the ACC system when the stationary object is an overhead bridge, or illuminating a warning indicator light (not shown) in the vehicle 10 by the FCW when the edge of the roadway is lined with orange barrels (construction zone obstacles 22).

Step 305, DETECT TARGET, may include the radar system 12 emitting a radar signal via a radar antenna 30. While the example of the radar system 12 described herein is only configured to determine a range and a bearing to a target and not configured to determine an elevation of the target 20, the teachings presented herein may also be useful for radar systems that can determine an elevation of the target 20. For example, it has been observed that a tunnel with smooth walls and no substantial irregularities on the tunnel wall can still cause reflections that are detected by radar systems.

Step 310, DETERMINE TARGET RANGE, may include the radar system 12 determining a range to the target 20 based on a time-of-flight analysis of a reflected radar signal, as will be recognized by those in the art.

Step 315, DETERMINE TARGET BEARING, may include the radar system 12 determining a bearing (horizontal direction) to the target 20 based on a received signal analysis of a reflected radar signal, as will be recognized by those in the art.

Step 320, DETERMINE YAW RATE, is an optional step that may include the radar system 12 receiving a signal from a yaw rate sensor (not shown) to determine the rate at which the vehicle 10 is turning. Alternatively, a yaw rate may be determined based on a steering angle of the steering wheels of the vehicle 10 and a speed of the vehicle 10. The speed may be provided by a speedometer signal available from the vehicle, or be determined by the radar system 12 based on relative motions of various detected targets (e.g. the targets 20) relative to the vehicle 10.

Step 325, DETERMINE TRAVEL PATH, is an optional step that may include the controller 24 using a yaw rate signal (not shown) to project a travel path 28 of the vehicle 10. In one embodiment, the travel path 28 has a width 32 that corresponds to the width of the vehicle. Alternatively the travel path may include a boundary zone 34 on either side of the vehicle 10 to provide a buffer to protect the vehicle 10 from being damaged by driver weaving.

Step 330, DETERMINE STATIONARY COUNT, may include determining a stationary count indicative of the number of the targets 20 detected by the radar system 12 that are within a travel path 32 of the vehicle 10 and are classified by the radar system 12 as stationary. In this non-limiting example, the stationary count is six (6). That is, six of the twelve targets are within the travel path 28.

Step 335, DETERMINE COUNT THRESHOLD, may include, wherein the count threshold is determined based on one or more of a steering angle, a yaw rate, and a vehicle speed. By way of example and not limitation, if the vehicle 10 is turning, the stationary count may be higher than when the vehicle 10 travels in a straight path because the radar system 12 detects objects that will be avoided because of the curvature of the travel path 28. Because of this, a higher count threshold may be desirable if the yaw rate exceeds a yaw threshold, one degree of angle per second (1 deg/s) for example. Alternatively, if the speed is very low (e.g. <1 kph), the radar system 12 may be configured to cease radiating so that the stationary count will go to zero. It is recognized that doing so may adversely affect the hysteresis. As a counter measure, the stationary count may be held at a present value when the radar system 12 ceases radiating so it that it doesn't have to count back up to the count threshold again before the YES logic path in the following step is taken.

Step 340, STATIONARY COUNT>COUNT THRESHOLD?, may include the controller 24 comparing the stationary count to the count threshold. If YES, the stationary count is greater than the count threshold, then the method 300 proceeds to step 345. Otherwise, if NO, the method 300 proceeds to step 305.

Step 345, INDICATE STATIONARY STRUCTURE, may include the controller 24 indicating that the vehicle 10 is proximate to a stationary structure by setting a tunnel detection flag in the controller 24 to TRUE, and thereby prevent the FCW from illuminating a warning indicator (not shown) viewable by an operator (not shown) of the vehicle 10. As such, an undesirable response by a vehicle safety system may be prevented if the proximity to a stationary structure is indicated by the controller 24.

Step 350, REDUCE RANGE THRESHOLD, is an optional step that may include reducing a range threshold used by the one or more vehicle safety systems 18. For example, if the stationary count is greater than the count threshold because the vehicle 10 is traveling within the tunnel 14, the ACC system may allow stationary objects detected by the radar system 12 to appear closer to the vehicle 10 before reducing the speed of the vehicle 10. Another example is that a CIB system may ignore stationary objects that fall outside a range of twenty-five meters (25 m) when the count threshold is reached.

Step 355, REDUCE TIME-TO-COLLISION THRESHOLD, is an optional step that may include reducing a time-to-collision threshold used by the one or more vehicle safety systems 18. For example, if the stationary count is greater than the count threshold because the vehicle 10 is traveling adjacent to a large number of the construction zone obstacles 22 lining the edge of the travel path 28, the CIB may allow stationary objects detected by the radar system 12 to appear closer to the vehicle 10 before applying the brakes of the vehicle 10. Is should be appreciated that the difference between step 350 and step 355 is that the range restriction is dependent on the speed of the vehicle 10. In step 350 only range is considered, but in step 355 the range at which objects are ignored is proportional to speed because the time-to-collision (TTC) is proportional to the vehicle speed multiplied by a range to a given a stationary target.

Accordingly, a radar system 12 and a method 300 of operating a radar system 12 on a vehicle 10 to reduce nuisance alerts caused by a stationary structure proximate to the vehicle 10 is provided. The method 300 determines when the vehicle 10 is in a tunnel or near a large number of overhead out-of-path targets. It can be used to suppress or reduce the effective range of the FCW and CIB countermeasures in response to the stationary targets (the targets 20). Targets that are moving or have been previously observed to move (classified as "stopped" rather than "stationary") are unaffected. The tunnel detector functions by counting the number of stationary targets within a margin, for example plus or minus one meter (1 m) of the travel path 28 base on curvature of the vehicle 10 when the vehicle 10 exceeds a certain speed, for example 32 kph. When the number of targets exceeds a threshold count (e.g. 12) the tunnel detection flag is set to TRUE and is held for a hold period, for example one second (1 s). Every time the threshold count is met, the hold period timer is started over. If the hold period expires or if the target count drops to a low count threshold, for example zero (0), the tunnel detection flag is set to FALSE.

While this invention has been described in terms of the preferred embodiments thereof, it is not intended to be so limited, but rather only to the extent set forth in the claims that follow.

We claim:

1. A method for operating a radar system on a vehicle to reduce nuisance alerts caused by a stationary structure proximate to the vehicle, said method comprising:
   providing a radar system that includes a radar antenna and a controller;
   determining by the system a stationary count indicative of the number of targets presently detected by the radar system that are within a travel path of the vehicle and are classified by the radar system as stationary; and
   indicating by the system that the vehicle is proximate to a stationary structure if the stationary count is greater than a count threshold.

2. The method in accordance with claim 1, wherein the stationary structure is characterized as one or more of a tunnel, a guardrail, an overhead bridge, and one or more construction-zone obstacles.

3. The method in accordance with claim 1, wherein the travel path has a width that corresponds to the width of the vehicle.

4. The method in accordance with claim 3, wherein the travel path includes a boundary zone on either side of the vehicle.

5. The method in accordance with claim 1, wherein the count threshold is determined based on one or more of a steering angle, a yaw rate, and a vehicle speed.

6. The method in accordance with claim 1, wherein the radar system is only configured to determine a range and a bearing to a target and not configured to determine an elevation of the target, wherein said method further comprises
   determining a range and a bearing to each target.

7. The method in accordance with claim 1, wherein said method further comprises
   determining a travel path of the vehicle based on one or more of a yaw rate, a vehicle speed, and a steering angle of the vehicle.

8. The method in accordance with claim 1, wherein said method further comprises
   preventing a response by a vehicle safety system if the proximity to a stationary structure is indicated.

9. The method in accordance with claim 8, wherein said method further comprises reducing a range threshold used by the vehicle safety system.

10. The method in accordance with claim 8, wherein said method further comprises reducing a time-to-collision threshold used by the vehicle safety system.

* * * * *